United States Patent
Iwata et al.

(10) Patent No.: US 10,892,913 B2
(45) Date of Patent: Jan. 12, 2021

(54) GATEWAY, ON-VEHICLE COMMUNICATION SYSTEM, COMMUNICATION CONTROL METHOD AND RECORDING MEDIUM

(71) Applicants: SUMITOMO ELECTRIC INDUSTRIES, LTD., Osaka (JP); AUTONETWORKS TECHNOLOGIES, LTD., Yokkaichi (JP); SUMITOMO WIRING SYSTEMS, LTD., Yokkaichi (JP)

(72) Inventors: Akihito Iwata, Osaka (JP); Hirofumi Urayama, Osaka (JP); Akihiro Ogawa, Osaka (JP); Takeshi Hagihara, Yokkaichi (JP); Yasuhiro Yabuuchi, Yokkaichi (JP)

(73) Assignees: Sumitomo Electric Industries, Ltd., Osaka (JP); AutoNetworks Technologies, Ltd., Yokkaichi (JP); Sumitomo Wiring Systems, Ltd., Yokkaichi (JP)

( * ) Notice: Subject to any disclaimer, the term of this patent is extended or adjusted under 35 U.S.C. 154(b) by 51 days.

(21) Appl. No.: 16/337,312

(22) PCT Filed: Jun. 28, 2017

(86) PCT No.: PCT/JP2017/023671
§ 371 (c)(1),
(2) Date: Mar. 27, 2019

(87) PCT Pub. No.: WO2018/061362
PCT Pub. Date: Apr. 5, 2018

(65) Prior Publication Data
US 2020/0036554 A1 Jan. 30, 2020

(30) Foreign Application Priority Data
Sep. 27, 2016 (JP) .................................. 2016-187940

(51) Int. Cl.
*H04L 12/66* (2006.01)
*H04W 4/40* (2018.01)
(Continued)

(52) U.S. Cl.
CPC ............ *H04L 12/66* (2013.01); *B60R 16/023* (2013.01); *H04L 12/4625* (2013.01);
(Continued)

(58) Field of Classification Search
None
See application file for complete search history.

(56) References Cited

U.S. PATENT DOCUMENTS

2012/0140752 A1* 6/2012 Yun .......................... B60L 53/65
370/338
2012/0206318 A1* 8/2012 Chang ................ H04N 21/4143
345/1.2
(Continued)

FOREIGN PATENT DOCUMENTS

JP 2011-073650 4/2011
JP 2012-119729 6/2012
(Continued)

OTHER PUBLICATIONS

Hiroshi Hayakawa, "Safety and Security for Connected Vehicles", The 12th Workshop on Critical Software Systems (12thWOCS2) [online], Jan. 22, 2015 (Jan. 22, 2015), [retrieval date Aug. 22, 2017 (Aug. 22, 2017)], Internet:URL:https://www.ipa.go.jp/files/000043984. pdf, pp. 24 to 36.
(Continued)

*Primary Examiner* — Rebecca E Song
(74) *Attorney, Agent, or Firm* — Baker Botts L.L.P.; Michael A. Sartori (57) ABSTRACT

A gateway that is mounted on a vehicle, includes: a communication unit that can communicate with an external
(Continued)

device through other gateway capable of communicating with the external device outside the vehicle, wherein said other gateway includes a switch unit that executes relay processing of relaying communication data and a processing unit that controls the relay processing of the switch unit, wherein said communication unit can relay communication data received from said switch unit to a device inside said vehicle, said gateway further including: a control unit that determines abnormality in said other gateway and if it is determined that said abnormality occurs, controls relay processing of said other gateway.

10 Claims, 4 Drawing Sheets (51) Int. Cl.
*B60R 16/023* (2006.01)
*H04L 12/46* (2006.01)
*H04L 29/08* (2006.01)
*H04W 88/16* (2009.01)
*H04L 12/40* (2006.01)

(52) U.S. Cl.
CPC ............... *H04L 67/12* (2013.01); *H04W 4/40* (2018.02); *H04W 88/16* (2013.01); *H04L 2012/40273* (2013.01)

(56) References Cited

U.S. PATENT DOCUMENTS

2017/0244594 A1* 8/2017 Shiota ............... H04W 12/1006
2018/0082575 A1* 3/2018 El-Mankabady ....... H04W 4/70

FOREIGN PATENT DOCUMENTS

| JP | 2015-088815 | | 5/2015 | |
| JP | 2016-012932 | | 1/2016 | |
| KR | 20140118919 A | * | 10/2014 | ........... H04L 67/125 |

OTHER PUBLICATIONS

Notification of Reasons for Refusal of JP2016-187940, dated Aug. 15, 2018, 3 pages.
English Translation of Decision to Grant of JP2016-187940, dated Sep. 18, 2018, 2 pages.

* cited by examiner

GATEWAY, ON-VEHICLE COMMUNICATION SYSTEM, COMMUNICATION CONTROL METHOD AND RECORDING MEDIUM

CROSS-REFERENCE TO RELATED APPLICATIONS

This application is the national phase under 35 U.S.C. § 371 of PCT International Application No. PCT/JP2017/023671 which has an International filing date of Jun. 28, 2017 and designated the United States of America, the entire contents of which is incorporated herein by reference.

FIELD

The present invention relates to a gateway, on-vehicle communication system, communication control method and recording medium.

The present invention claims the priority based on Japanese Patent Application Laid-Open Publication No. 2016-187940 filed Sep. 27, 2016 and incorporates an entire description of the same disclosure.

BACKGROUND

Japanese Patent Application Laid-Open Publication No. 2016-12932 has disclosed following station equipment.

That is, the station equipment includes an active system (for current use) OSU 1 to N, standby system (spare) OSU N+1 and control unit. The control unit exchanges management information about the OSU linked to a logical line with a network management system (NMS). The logical line is defined by a fixed combination of an optical line unit and a passive optical network. On the other hand, the OSU acquires management information linked to a real line. The real line indicates an actual combination of the optical network unit and the passive optical network. The control unit converts the line linked to the management information between the logical line and the real line reciprocally by using mapping information.

SUMMARY (1) A gateway according to the present disclosure is a gateway that is mounted on a vehicle, including: a communication unit that can communicate with an external device through other gateway capable of communicating with the external device outside said vehicle, wherein said other gateway includes: a switch unit that executes relay processing of relaying communication data; and a processing unit that controls said relay processing of said switch unit, wherein said communication unit can relay communication data received from said switch unit to a device inside said vehicle, wherein said gateway further includes: a control unit that determines abnormality in said processing unit and if it is determined that said abnormality occurs, controls said relay processing of said switch unit.

(8) A on-vehicle communication system according to the present disclosure is an on-vehicle communication system that is mounted on a vehicle, including: a first gateway that can communicate with an external device outside said vehicle; and a second gateway that can communicate with said external device through said first gateway, wherein said first gateway includes: a switch unit that executes relay processing of relaying communication data; and a processing unit that controls said relay processing of said switch unit, wherein said second gateway can relay communication data received from said switch unit to a device inside said vehicle, and said second gateway determines abnormality in said processing unit and if it is determined that said abnormality occurs, controls said relay processing of said switch unit.

(9) A communication control method according to the present disclosure is a communication control method for the gateway mounted on the vehicle, wherein said gateway can communicate with said external device through other gateway capable of communicating with said external device outside said vehicle, wherein said other gateway includes: a switch unit that executes relay processing of relaying communication data; and a processing unit that controls said relay processing of said switch unit, wherein said gateway can relay communication data received from said switch unit to a device inside said vehicle, said communication control method including: a step of determining abnormality in said processing unit and a step of, if it is determined that said abnormality occurs, controlling said relay processing of said switch unit.

(10) A communication control method according to the present disclosure is a communication control method for the on-vehicle communication system mounted on a vehicle, wherein said on-vehicle communication system includes: a first gateway that can communicate with an external device outside said vehicle; and a second gateway that can communicate with said external device through said first gateway, wherein said first gateway includes: a switch unit that executes relay processing of relaying communication data, and a processing unit that controls said relay processing of said switch unit, wherein said second gateway can relay communication data received from said switch unit to a device inside said vehicle, said communication control method including: a step of determining abnormality in said processing, and a step of, if it is determined that said abnormality occurs, controlling said relay processing of said switch unit.

(11) A computer readable non-transitory recording medium recording a communication control program according to the present disclosure is a communication control program for use in a gateway mounted on a vehicle, said program making a computer function as a communication unit that can communicate with an external device through other gateway capable of communicating with the external device outside said vehicle, wherein said other gateway includes: a switch unit that executes relay processing of relaying communication data; and a processing unit that controls said relay processing of said switch unit, wherein said communication unit can relay communication data received from said switch unit to a device inside said vehicle, said communication control program further making the computer function as a control unit that controls said relay processing of said switch unit if it is determined that said abnormality occurs.

An embodiment of the present disclosure cannot only be realized as a gateway which includes the above-described characteristic processing unit but can be realized as a semiconductor integrated circuit which achieves a part or all of the gateway.

Further, the embodiment of the present disclosure cannot only be realized as an on-vehicle communication system having such a characteristic processing unit but can be realized as a semiconductor integrated circuit which achieves a part or all of the on-vehicle communication system.

The above and further objects and features of the invention will more fully be apparent from the following detailed description with accompanying drawings.

Conventionally, a technology for duplication (redundancy) of a system for providing a high quality services has been developed.

There is a case a case where a vehicle is provided with a gateway for relaying information from an external device outside a vehicle to an internal device inside the vehicle. With such a configuration, for example, if the gateway receives an intentional attack of being sent a large amount of data continuously, gateway's operation becomes unstable. A technology capable of achieving a stable operation of the gateway by redundancy of the system has been demanded. However, no such redundancy has been disclosed in Japanese Patent Application Laid-Open Publication No. 2016-12932.

The present disclosure has been achieved to solve the above-described problem and an object of the disclosure is to provide a gateway, on-vehicle communication system, communication control method and communication control program, which achieve a stable operation of the gateway for relaying information from an external device in the on-vehicle network.

According to the present disclosure, a more stable operation of the gate for relaying information from an external device can be achieved in the in-vehicle network.

DESCRIPTION OF EMBODIMENTS OF THE PRESENT DISCLOSURE

First, a content of embodiments of the present disclosure will be described sequentially.

(1) A gateway according to an embodiment of the present disclosure is a gateway that is mounted on a vehicle, which includes: a communication unit that can communicate with an external device through other gateway capable of communicating with the external device outside said vehicle, wherein said other gateway includes: a switch unit that executes relay processing of relaying communication data; and a processing unit that controls said relay processing of said switch unit, wherein said communication unit can relay communication data received from said switch unit to a device inside said vehicle, wherein said gateway further includes: a control unit that determines abnormality in said processing unit and if it is determined that said abnormality occurs, controls said relay processing of said switch unit.

With such a configuration, for example, if other gateway receives an intentional attack from an external device so that it cannot control its own relay processing properly, the gateway can control the relay processing of the other gateway instead of the other gateway. Therefore, redundancy in operation of the gateway which relays information from an external device is achieved in the on-vehicle network, thereby realizing a more stable operation of the gateway. As a result, communication data can be relayed stably. Thus, a case where any important communication data for vehicle control for automatic driving, for example, is not relayed can be avoided.

(2) Preferably, said control unit controls communication through said switch unit 51 of said external device by controlling said relay processing of said switch unit.

With such a configuration, the relay processing of the switch unit can be controlled in correspondence to an object for the relay processing. More specifically, for example, the relay processing for communication data with an external device can be stopped or inhibited while continuing the relay processing for communication data between devices inside the vehicle.

(3) More preferably, the control unit controls said relay processing of said switch unit so as to shut down communication from an external device.

With such a configuration, unfavorable data such as large-amount data aiming at attack and illegal data can be prevented from flowing into the on-vehicle network. Thus, security of the on-vehicle network can be improved.

(4) Preferably, said control unit controls communication of a device inside said vehicle through said switch unit by controlling said relay processing of said switch unit.

With such a configuration, the relay processing of the switch unit can be controlled in correspondence to an object for the relay processing. More specifically, for example, communication of a device inside the vehicle through the switch unit can be stopped or inhibited.

(5) Preferably, said control unit determines abnormality in said switch unit and then, executes a processing corresponding to a determination result.

With such a configuration, abnormality in the routing table indicating a communication route for communication data and abnormality such as a low success rate about the relay processing can be determined regardless of normality or abnormality in the processing unit. Further, if the control unit determines that the switch unit is abnormal, the control unit recognizes that the relay processing between devices inside the vehicle is not being executed appropriately and executes a necessary processing. If the control unit determines that the switch unit is normal, the control unit can continue the relay processing between the devices inside the vehicle.

(6) More preferably, the control unit, if it determines that abnormality occurs in the switch unit, shuts down communication of a device inside the vehicle through the gateway thereof.

With such a configuration, for example, when a device inside the vehicle is connected to a network outside the vehicle not through other gateway, unfavorable data can be prevented from flowing from the outside network into the on-vehicle network by mistake.

(7) More preferably, said control unit notifies of a content based on abnormality determination result about said switch unit.

Such a configuration can notify user of a situation of an abnormal relay processing in other gateway.

(8) The on-vehicle communication system according to an embodiment of the present disclosure is an on-vehicle communication system that is mounted on a vehicle, including: a first gateway that can communicate with an external device outside said vehicle; and a second gateway that can communicate with said external device through said first gateway, wherein said first gateway includes: a switch unit that executes relay processing of relaying communication data; and a processing unit that controls said relay processing of said switch unit, wherein said second gateway can relay communication data received from said switch unit to a device inside said vehicle, and said second gateway determines abnormality in said processing unit and if it is determined that said abnormality occurs, controls said relay processing of said switch unit.

With such a configuration, for example, if a first gateway receives an intentional attack from an external device so that it cannot control its own relay processing properly, a second gateway can control the relay processing of the first gateway instead of the first gateway. Therefore, redundancy in operation of the gateway which relays information from an external device is achieved in the on-vehicle network, thereby realizing a more stable operation of the gateway. As a result, communication data can be relayed stably. Thus, a case where any important communication data for vehicle control for automatic driving, for example, is not relayed can be avoided.

(9) A communication control method according to an embodiment of the present disclosure is a communication control method for a gateway mounted on a vehicle, wherein said gateway can communicate with said external device through other gateway capable of communicating with an external device outside said vehicle, wherein said other gateway includes: a switch unit that executes relay processing of relaying communication data, and a processing unit that controls said relay processing of said switch unit, wherein said gateway can relay communication data received from said switch unit to a device inside said vehicle, said communication control method including: a step of determining abnormality in said processing unit; and a step of, if it is determined that said abnormality occurs, controlling said relay processing of said switch unit.

With such a configuration, for example, if other gateway receives an intentional attack from an external device so that it cannot control its own relay processing properly, the gateway can control the relay processing of the other gateway instead of the other gateway. Therefore, redundancy in operation of the gateway which relays information from an external device is achieved in the on-vehicle network, thereby realizing a more stable operation of the gateway. As a result, communication data can be relayed stably. Thus, a case where any important communication data for vehicle control for automatic driving, for example, is not relayed can be avoided.

(10) A communication control method according to an embodiment of the present disclosure is a communication control method for an on-vehicle communication system mounted on a vehicle, wherein said on-vehicle communication system includes: a first gateway that can communicate with an external device outside said vehicle; and a second gateway that can communicate with said external device through said first gateway, wherein said first gateway includes: a switch unit that executes relay processing of relaying communication data, and a processing unit that controls said relay processing of said switch unit, wherein said second gateway can relay communication data received from said switch unit to a device inside said vehicle, said communication control method further including: a step of determining abnormality in said processing unit, and a step of, if it is determined that said abnormality occurs, controlling said relay processing of said switch unit.

With such a configuration, for example, if a first gateway receives an intentional attack from an external device so that it cannot control its own relay processing properly, the second gateway can control the relay processing of the first gateway instead of the first gateway. Therefore, redundancy in operation of the gateway which relays information from an external device is achieved in the on-vehicle network, thereby realizing a more stable operation of the gateway. As a result, communication data can be relayed stably. Thus, a case where any important communication data for vehicle control for automatic driving, for example, is not relayed can be avoided.

(11) A communication control program according to an embodiment of the present disclosure is a communication control program for use in a gateway mounted on a vehicle, said program making a computer function as a communication unit that can communicate with an external device through other gateway capable of communicating with the external device outside said vehicle, wherein said other gateway includes: a switch unit that executes relay processing of relaying communication data, and a processing unit that controls said relay processing of said switch unit, wherein said communication unit can relay communication data received from said switch unit to a device inside said vehicle, said communication control program further making the computer function as a control unit that controls said relay processing of said switch unit if it is determined that said abnormality occurs.

With such a configuration, for example, if other gateway receives an intentional attack from an external device so that it cannot control its own relay processing properly, the gateway can control the relay processing of the other gateway instead of the other gateway. Therefore, redundancy in operation of the gateway which relays information from an external device is achieved in the on-vehicle network, thereby realizing a more stable operation of the gateway. As a result, communication data can be relayed stably. Thus, a case where any important communication data for vehicle control for automatic driving, for example, is not relayed can be avoided.

Hereinafter, embodiments of the present disclosure will be described with reference to drawings. In the meantime, the same reference numerals are attached to the same components or equivalent components in order to skip repeated description thereof. Further, it is permissible to combine at least parts of embodiments described below.

[Configuration and Basic Operation]

Figure 1:
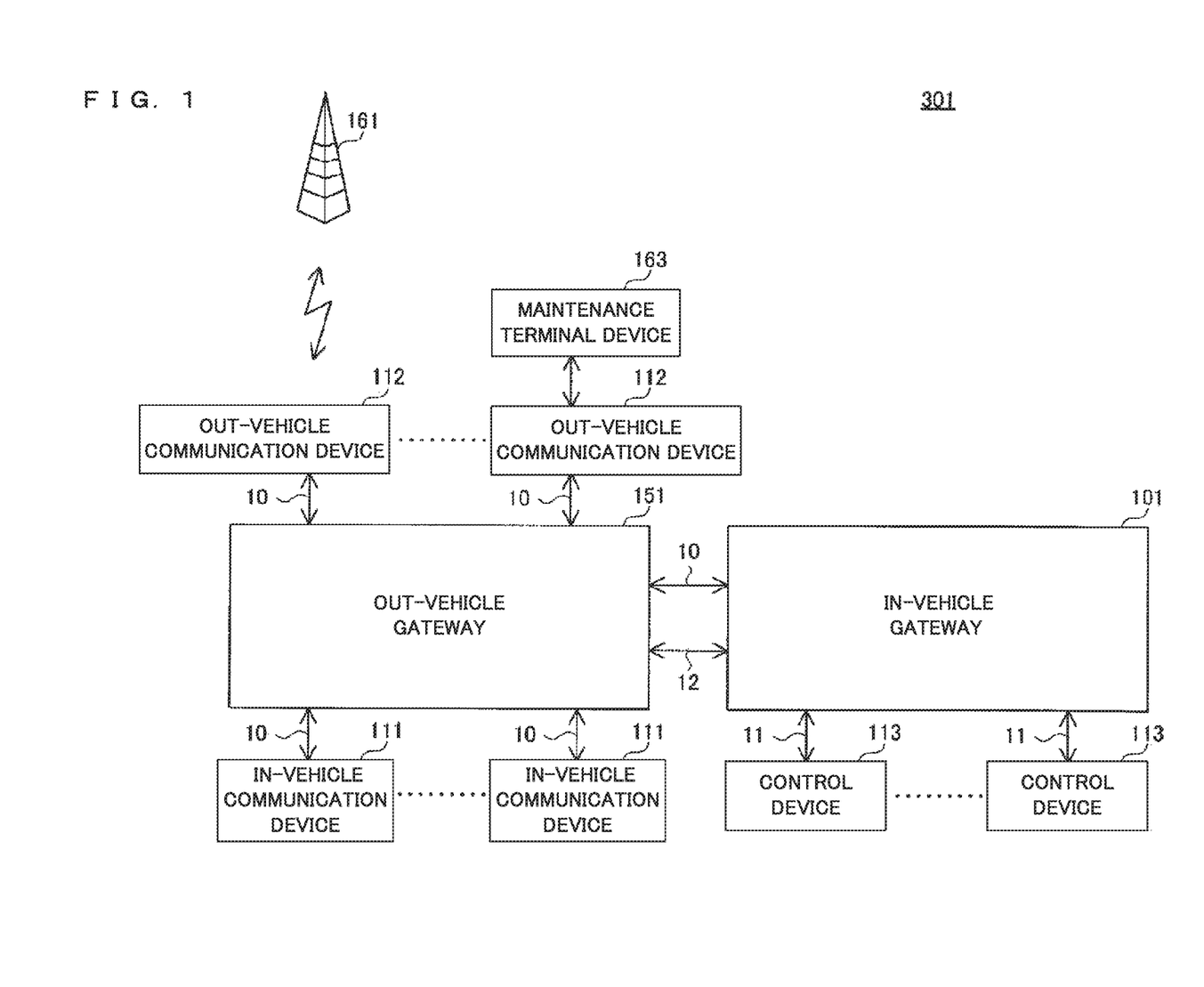
FIG. 1 is a diagram showing a configuration of an on-vehicle communication system according to an embodiment of the present disclosure.

FIG. 1 is a diagram showing a configuration of an on-vehicle communication system according to an embodiment of the present disclosure.

With reference to FIG. 1, an on-vehicle communication system 301 includes an in-vehicle gateway 101 and an out-vehicle gateway 151.

The on-vehicle communication system 301 is mounted on a vehicle. Further, as an example of devices inside the vehicle, a plurality of in-vehicle communication devices 111, a plurality of out-vehicle communication devices 112 and a plurality of control devices 113 are mounted on the vehicle.

In the meantime, the vehicle is not restricted to a configuration of having a plurality of the in-vehicle communication devices 111 but may be configured to have a single in-vehicle communication device 111. Further, the vehicle is not restricted to a configuration having a plurality of the out-vehicle communication devices 112 but may be configured to have a single in-vehicle communication device 111. Further, the vehicle is not restricted to a configuration having a plurality of the control devices 113 but may be configured to have a single control device 113.

The in-vehicle communication device 111 is, for example, human-machine interface, camera, laser radar, sensor, audio, navigation device and driving assist system for automatic driving and capable of communicating with the out-vehicle gateway 151.

The out-vehicle communication device 112 is, for example, a radio communication device and communication module. According to such communication standard as LTE (Long Term Evolution) and 3G, for example, the radio communication device can communicate with a radio station equipment 161 wirelessly and further, communicate with the out-vehicle gateway 151.

The communication module can communicate with a maintenance terminal device 163 according to a communication standard, for example, OBD2 (On Board Diagnosis second generation) wirelessly and further communicate with the out-vehicle gateway 151. In the meantime, the maintenance terminal device 163 may not be connected to the communication module except at the time of maintenance.

The control device 113 is, for example, engine control device, AT (Automatic Transmission) control device, HEV (Hybrid Electric Vehicle) control device, brake control device, chassis control device, steering control device and instrument indication control device.

Specifically, the in-vehicle gateway 101 is a central gateway and can communicate with the control device 113 through CAN (Controller Area Network) 11 and further with the out-vehicle gateway 151.

The in-vehicle gateway 101 executes relay processing about information which is exchanged between the control device 113, the in-vehicle communication device 111 and the out-vehicle communication device 112.

The out-vehicle gateway 151 is connected to the in-vehicle communication device 111, the out-vehicle communication device 112 and the in-vehicle gateway 101, for example, through Ethernet (registered trademark) cable 10.

The out-vehicle gateway 151 can communicate with the in-vehicle communication device 111 connected directly thereto, the out-vehicle communication device 112 and the in-vehicle gateway 101.

Information is exchanged between the out-vehicle gateway 151 and other device connected directly to the out-vehicle gateway 151 by using Ethernet frame.

Further, the out-vehicle gateway 151 can communicate with external devices outside the vehicle. More specifically, the out-vehicle gateway 151 can communicate with a server which is an example of the external device through the out-vehicle communication device 112 and the radio station apparatus 161.

Further, the out-vehicle gateway 151 can communicate with the out-vehicle communication device 112 linked with the maintenance terminal device 163 which is an example of the external devices through the out-vehicle communication device 112.

[Configuration of Out-Vehicle Gateway 151]

Figure 2:
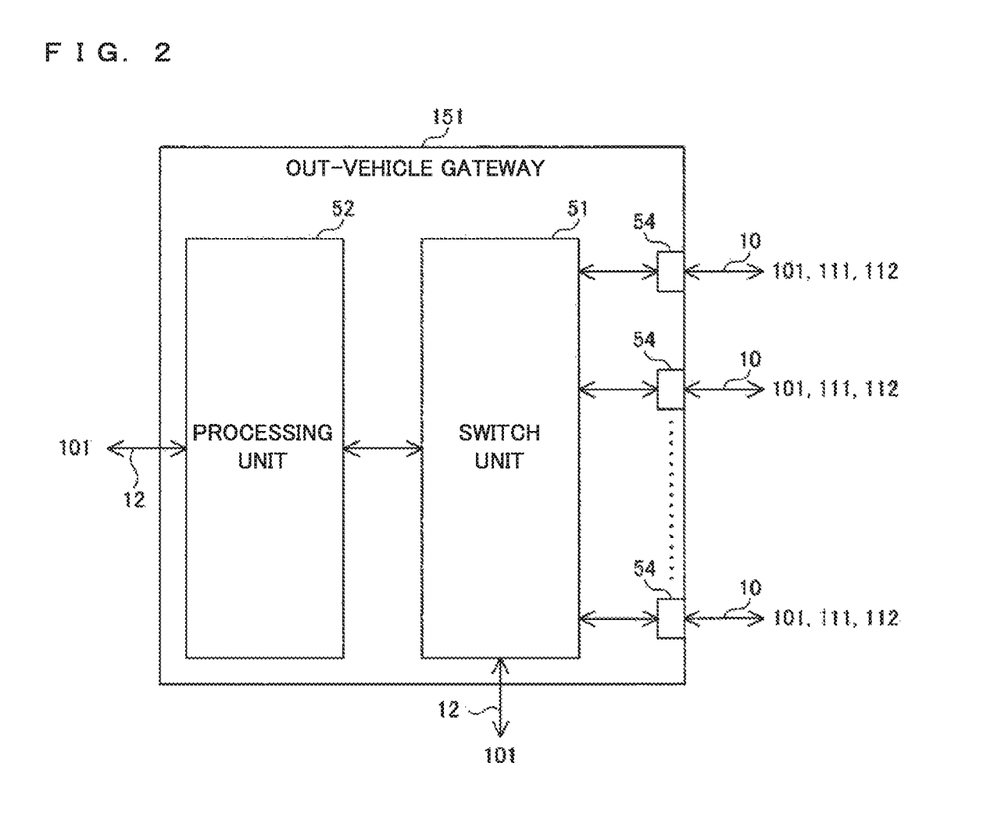
FIG. 2 is a diagram showing a configuration of an out-vehicle gateway in the on-vehicle communication system according to the embodiment of the present disclosure.

FIG. 2 is a diagram showing a configuration of the out-vehicle gateway of the on-vehicle communication system according to an embodiment of the present disclosure.

With reference to FIG. 2, the out-vehicle gateway 151 includes a switch unit 51, a processing unit 52 and a plurality of communication ports 54.

The communication port 54 of the out-vehicle gateway 151 is, for example, a terminal to which the Ethernet cable 10 can be connected. In the meantime, the communication port 54 may be an IC terminal.

Each of the plurality of the communication ports 54 is connected to any one of the in-vehicle gateway 101, the in-vehicle communication device 111 and the out-vehicle communication device 112 through the Ethernet cable 10.

Further, the plurality of the communication ports 54 corresponds to each LANs (Local Area Network). More specifically, for example, human machine interface, a camera, a laser radar, a sensor, a navigation device, driving assist system and the in-vehicle gateway 101, which are examples of the in-vehicle communication devices 111, belong to LAN 1. The communication ports 54 connected to these devices correspond to the LAN 1.

Further, the plurality of the out-vehicle communication devices 112 belong to LAN 2, which is different from the LAN 1. The communication ports 54 connected to each out-vehicle communication device 112 correspond to the LAN 2.

The switch unit 51 executes relay processing of relaying communication data. More specifically, the switch unit 51 is, for example, an L2 (layer 2) switch and a specific MAC address is allocated to each of the communication ports 54.

Further, the switch unit 51 contains a routing table for each LAN indicating a communication route for the Ethernet frame to be exchanged between devices belonging to the same LAN.

For example, a communication route for transmitting an Ethernet frame received from a navigation device to the in-vehicle gateway 101 is indicated on the routing table. More specifically, the routing table contains a correspondence relation between the MAC address of a navigation device which is a sender, MAC address of the in-vehicle gateway 101 which is a destination and a port number of the communication port 54 connected to the in-vehicle gateway 101.

If the switch unit 51 receives an Ethernet frame from the navigation device, for example, it confirms a sender MAC address and destination MAC address contained in the received Ethernet frame and then, acquires a port number corresponding to these addresses from the routing table. Then, the switch unit 51 sends the received Ethernet frame to the destination device, that is, the in-vehicle gateway 101 through the communication port 54 corresponding to the acquired port number.

Further, the switch unit 51 contains a management database indicating success/failure result of the relay processing for each communication route, for example. Here, the communication route is specified by the sender MAC address and destination MAC address contained in the Ethernet frame for which the switch unit 51 has executed the relay processing, and the port number corresponding to these addresses.

Each time when executing the relay processing, the switch unit 51 records a success/failure result of the relay processing in the management database. As a result, for each communication route, the management database counts a number of the Ethernet frames whose relay processing has succeeded and a number of the Ethernet frames whose relay processing has failed.

Further, if the switch unit 51 receives an Ethernet frame transmitted between devices belonging to different LANs, for example, the switch unit 51 acquires an IP packet from the received Ethernet frame and outputs the acquired IP packet to the processing unit 52.

More specifically, if the switch unit 51 receives an Ethernet frame to be sent to the out-vehicle gateway 101 from the out-vehicle communication device 112, for example, the switch unit 51 acquires an IP packet from the received Ethernet frame and then, outputs the acquired IP packet to the processing unit 52.

The processing unit 52 controls the relay processing of the switch unit 51. More specifically, the processing unit 52 sets up a content of the routing table in the switch unit 51, for example, and further, controls the relay processing of the switch unit 51 by executing layer 3 (L3) routing and layer 4 (L4) routing.

More specifically, the processing unit 52 contains a routing table indicating a correspondence relation between a port number of the communication port 54 and an IP address corresponding to that port number, for example.

For example, if the processing unit 52 receives an IP packet from the switch unit 51, the processing unit 52 determines that the IP packet received from the out-vehicle communication device 112 belonging to the LAN 2 should be transmitted to the in-vehicle gateway 101 belonging to the LAN 1, based on the IP address contained in the received IP packet and the routing table.

Then, the processing unit 52 acquires a port number corresponding to the IP address from the routing table and outputs the acquired port number and IP packet to the switch unit 51.

If the switch unit 51 receives a port number and an IP packet from the processing unit 52, the switch unit 51 stores the received IP packet in the Ethernet frame and then, sends the Ethernet frame to a destination device, that is, the in-vehicle gateway 101 through the communication port 54 of the given port number.

Further, the switch unit 51 and the processing unit 52 are connected to the in-vehicle gateway 101 through a serial cable 12, for example, so that the switch unit 51 and the processing 52 can execute serial communication with the in-vehicle gateway 101.

[Problem]

In the out-vehicle gateway 151, the processing unit 52 can receive an attack of being sent a large amount of data from an external device through the out-vehicle communication device 112.

If the processing unit 52 receives a Dos attack, the processing unit 52 cannot control the relay processing in the switch unit 51 favorably. In such a circumstance, communication data used for automatic driving such as the Ethernet frame from a camera and a laser radar may not be relayed properly to the driving assist system. Further, if the navigation system is connected to a network outside the vehicle not through the out-vehicle gateway 151, for example, firmware of a device inside the vehicle may be rewritten illegally by communication data from the navigation system.

Then, in the on-vehicle communication system according to the embodiment of the present disclosure, such a problem is solved by a configuration and operation described below.

[Configuration of In-Vehicle Gateway 101]

Figure 3:
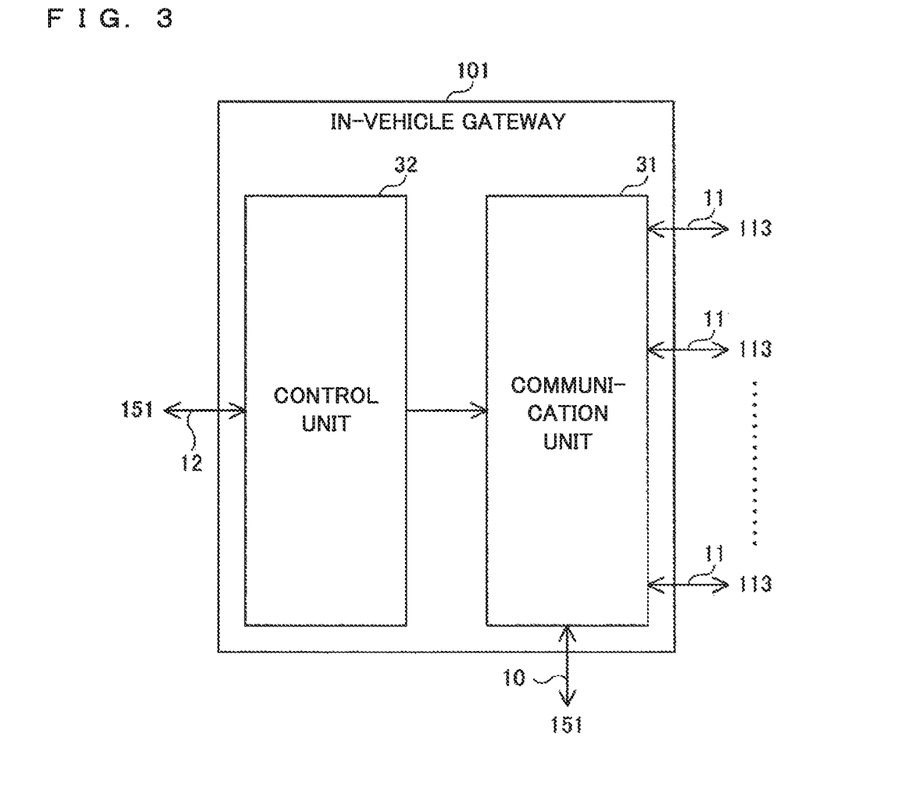
FIG. 3 is a diagram showing a configuration of an in-vehicle gateway in the on-vehicle communication system according to the embodiment of the present disclosure.

FIG. 3 is a diagram showing a configuration of the in-vehicle gateway in the on-vehicle communication system according to an embodiment of the present disclosure.

With reference to FIG. 3, the in-vehicle gateway 101 includes a communication unit 31 and a control unit 32.

A communication unit 31 in the in-vehicle gateway 101 can communicate with an external device, that is, a server and a maintenance terminal device 163 through the out-vehicle gateway 151.

The communication unit 31 can relay communication data received from the switch unit 51 of the out-vehicle gateway 151 to the control device 113. Further, the communication unit 31 can relay communication data received from the control device 113 to the switch unit 51.

More specifically, the communication unit 31 relays communication data by executing protocol conversion between CAN protocol and Ethernet communication protocol. When the communication unit 31 receives an Ethernet frame from the switch unit 51, the communication unit 31 acquires information from the received Ethernet frame and then, sends a packet according to the CAN protocol which stores the acquired information to the control device 113.

Further, when the communication unit 31 receives the packet according to the CAN protocol from the control device 113, the communication device 31 acquires information from the received packet and sends the Ethernet frame which stores the acquired information to the switch unit 51.

With reference to FIG. 2 and FIG. 3, the control unit 32 determines abnormality in the processing unit 52 of the out-vehicle gateway 151. More specifically, the control unit 32 executes health check for the processing unit 52, for example, periodically.

More specifically, the control unit 32 acquired a value of a register in a CPU (Central Processing Unit) contained by the processing unit 52 through the serial cable periodically and then, determines whether the processing unit 52 is hung up based on the acquired value. In the meantime, the control unit 32 may acquire the value of the register in the above-described CPU through the Ethernet cable 10.

If the processing unit 52 is hung up, the control unit 32 determines that the processing unit 52 is abnormal and then, if the processing unit 52 is operating normally without being hung up, the control unit 32 determines that the processing unit 52 is normal.

Further, the control unit 32 sends a Ping packet through the communication unit 31 and the Ethernet cable 10 periodically. Unless the control unit 32 can receive a response packet to the Ping packet from the out-vehicle gateway 151 through the Ethernet cable 10 and the communication unit 31 within a predetermined time interval because the processing unit 52 of the out-vehicle gateway 151 is hung up, the control unit 32 determines that the processing unit 52 is abnormal. On the other hand, if the control unit 32 can receive that response from the out-vehicle gateway 151 through the Ethernet cable 10 and the communication unit 31 within a predetermined time interval, the control unit 32 determines that the processing unit 52 is normal.

If the control unit 32 determines that abnormality occurs in the processing unit 52, the control unit 32 controls the relay processing of the switch unit 51. In detail, the control unit 32 controls communication of an external device through the switch unit 51 by controlling the relay processing of the switch unit 51.

In detail, the control unit 32 controls the relay processing of the switch unit 51 so as to shut down communication from the external device.

More specifically, the control unit 32 changes a host of the switch unit 51 from the processing unit 52 to itself by controlling the switch unit 51 in the out-vehicle gateway 151 through the serial cable 12, for example.

Then, the control unit 32 sets up the switch unit 51 to abolish the Ethernet frame received from an external device through the out-vehicle communication device 112.

More specifically, the control unit 32 sends a setup instruction S1 indicating the above-described setting to the out-vehicle gateway 151 through the serial cable 12.

If the switch unit 51 in the out-vehicle gateway 151 receives the setup instruction S1 from the in-vehicle gateway 101, the switch unit 51 executes an operation of abolishing the Ethernet frame received from the external device through the out-vehicle communication device 112.

Consequently, in the out-vehicle gateway 151, the IP packet contained in the Ethernet frame received from the external device through the out-vehicle communication device 112 is not output to the processing unit 52, so that the processing unit 52 can be recovered from the hang-up condition.

Further, the control unit 32 controls communication of a device inside the vehicle through the switch unit 51 by controlling the relay processing of the switch unit 51.

In detail, the control unit 32 determines abnormality in the switch unit 51, for example. More specifically, the control unit 32 has a regular routing table which is a proper routing table. The control unit 32 acquires a routing table possessed by the switch unit 51 in the out-vehicle gateway 151 through the serial cable 12 and compares the acquired routing table with the regular routing table.

Unless the routing table and the regular routing table acquired from the switch unit 51 coincide with each other, the control unit 32 determines that the routing table has been rewritten improperly and then determines that the switch unit 51 is abnormal.

Further, the control unit 32 acquires management database from the switch unit 51 through the serial cable 12, for example. The control unit 32 determines whether the relay processing at the switch unit 51 succeeds or fails by referring to the acquired management database.

The control unit 32 calculates a success rate of the relay processing based on the management database, for example, and if there is a success rate lower than a predetermined threshold in the calculated success rates, the control unit 32 determines that the switch unit 51 is abnormal.

In the meantime, the control unit 32 is not restricted to a configuration of acquiring the routing table and the management database through the serial cable 12, but may be configured to acquire at least any one of the routing table and the management database through the communication unit 31 and the Ethernet cable 10.

The control unit 32 executes a processing corresponding to an abnormality determination result by the switch unit 51. Specifically, if the control unit 32 determines that abnormality occurs, the control unit 32 shuts down communication of a device inside the vehicle through the in-vehicle gateway 101 thereof.

More specifically, the control unit 32 changes a host of the switch unit 51 from the processing unit 52 to itself by controlling the switch unit 51 in the out-vehicle gateway 151 through the serial cable 12, for example.

The control unit 32 sets up the switch unit 51 in the out-vehicle gateway 151 to abolish the Ethernet frame from the in-vehicle communication device 111 to the control device 113.

More specifically, the control unit 32 sends a setup instruction S2 indicating the above-described setting to the out-vehicle gateway 151 through the serial cable 12.

When the switch unit 51 in the out-vehicle gateway 151 receives the setup instruction S2 from the in-vehicle gateway 101, the switch unit 51 executes an operation of abolishing an Ethernet frame to be sent from the in-vehicle communication device 111 to the control device 113 according to the received setup instruction S2.

Consequently, the on-vehicle communication system 301 can prevent the Ethernet frame sent from the in-vehicle communication device 111 such as a navigation system connected to a network outside the vehicle not through the out-vehicle gateway 151 from being relayed to the control device 113. Thus, firmware in the control device 113 can be inhibited from being rewritten improperly.

Further, the control unit 32 notifies of a content based on abnormality determination result, for example. More in detail, if a success rate of the relay processing executed through the communication port 54, to which the in-vehicle communication device 111 for such multimedia system as an audio and navigation device is connected, is lower than a predetermined threshold, the control unit 32 creates notice information indicating that an abnormality has occurred in communication of the in-vehicle communication device 111 for the multimedia system.

On the other hand, if a success rate of the relay processing executed through the communication port 54, to which the in-vehicle communication device 111 for collecting data for use for automatic driving such as a camera and a laser radar is connected, is lower than the predetermined threshold, the control unit 32 creates warning information indicating that abnormality has occurred in communication of the in-vehicle communication device 111 for the automatic driving system.

The control unit 32 sends created notice information and warning information to an instrument indication control device, for example, through the communication unit 31 and the CAN 11.

If the instrument indication control device receives notice information and warning information from the in-vehicle gateway 101, the instrument indication control device notifies user by indicating received information on an instrument.

In the meantime, the control unit 32 is not restricted to the configuration of sending created notice information and warning information to the instrument indication control device, but may send the notice information and warning information to a radio terminal device such as a smart phone carried by user through the out-vehicle gateway 151 and the out-vehicle communication device 112.

[Operation]

Individual units of the on-vehicle communication system 301 has a computer. An arithmetic operation unit such as a CPU of the computer reads out and executes a program containing a part or all of individual steps of a sequence diagram or flow chart described below. Each of programs of these units can be installed from outside. The programs of these units are distributed in the a market with a condition that each program is stored in a recording medium.

Figure 4:
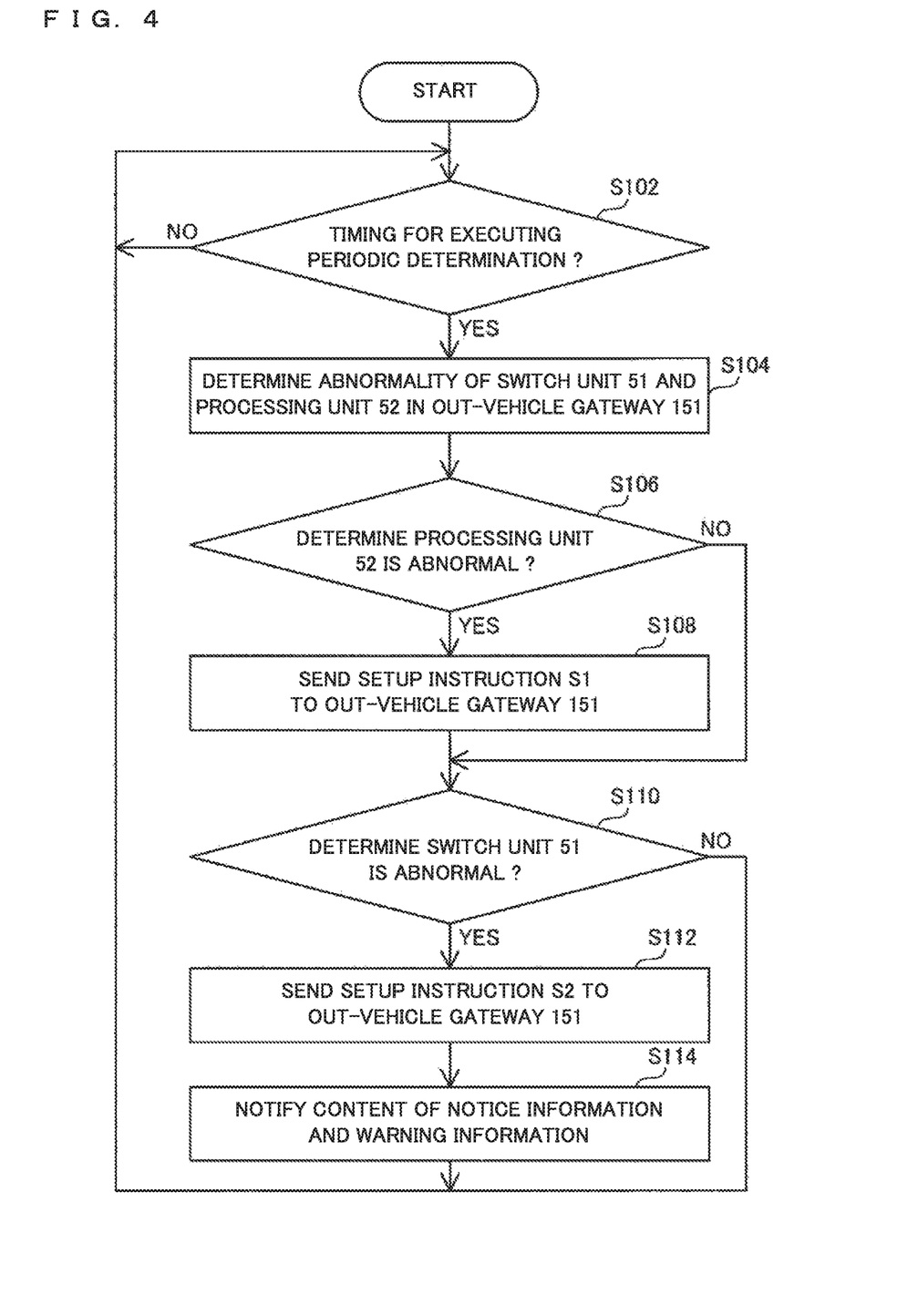
FIG. 4 is a flowchart which specifies operating steps when the in-vehicle gateway in the on-vehicle communication system according to an embodiment of the present disclosure executes relay processing in the out-vehicle gateway.

FIG. 4 is a flowchart which specifies operation steps when the in-vehicle gateway in the on-vehicle communication system according to an embodiment of the present disclosure executes the relay processing in the out-vehicle gateway.

With reference to FIG. 4, assume a situation that the processing unit 52 in the out-vehicle gateway 151 is a host of the switch unit 51.

First, the in-vehicle gateway 101 waits until a timing for executing periodic determination arrives (NO in step S102).

Then, if the timing for the determination arrives (YES in step S102), the in-vehicle gateway 101 determines abnormality in the switch unit 51 and the processing unit 52 in the out-vehicle gateway 151 (step S104).

Next, if the in-vehicle gateway 101 determines that the processing unit 52 is abnormal (YES in step S106), the in-vehicle gateway 101 sends the setup instruction S1 to the switch unit 51 in the out-vehicle gateway 151 (step S108).

Next, if the in-vehicle gateway 101 sends the setup instruction S1 to the out-vehicle gateway 151 (step S108) or determines that the processing unit 52 is normal (NO in step S106), the in-vehicle gateway 101 executes following processing.

That is, if the in-vehicle gateway determines that the switch unit 51 is abnormal (YES in step S110), the in-vehicle gateway 101 sends the setup instruction S2 to the switch unit 51 in the out-vehicle gateway 151 (step S112).

Next, the in-vehicle gateway 101 notifies of a content of the notice information and warning information created corresponding to a communication route in which abnormality in the relay processing by the switch unit 51 occurs (step S114).

Next, the in-vehicle gateway 101 notifies of the content of the notice information and warning information (step S114) or if the in-vehicle gateways 101 determines that the switch unit 51 is normal (NO in step S110), the in-vehicle gateway 101 waits until a timing for executing new determination arrives (NO in step S102).

In the meantime, an order of the above-mentioned steps S106-S108 and steps S110-S114 are not restricted to the above description but may be exchanged.

Further, the above-mentioned order of the steps S112 and S114 is not restricted to the above description but may be exchanged.

Further, in the on-vehicle communication system according to an embodiment of the present disclosure, the control unit 32 in the in-vehicle gateway 101 is configured to control communication of an external device through the switch unit 51 and communication of a device inside the vehicle through the switch unit 51 if the control unit 32 determines that abnormality occurs in the processing unit 52 in the out-vehicle gateway 151. However, the control unit 32 is not restricted to this configuration. The control unit 32 may be configured to control any one of these communications if it determines that abnormality occurs in the processing unit 52.

Further, in the on-vehicle communication system according to an embodiment of the present disclosure, the control unit 32 in the in-vehicle gateway 101 is configured to control the relay processing of the switch unit 51 so as to shut down the communication from an external device, the control unit 32 is not restricted to this configuration. The control unit 32 may be configured to control the relay processing of the switch unit 51 to suppress data amount of communication from an external device.

Further, in the on-vehicle communication system according to an embodiment of the present disclosure, the control unit 32 in the vehicle gateway 101 is configured to shut down communication of a device inside the vehicle through the in-vehicle gateway 101, the control unit 32 is not restricted to this configuration. The control unit 32 may be configured to suppress the communication data amount of communication of a device inside the vehicle through the in-vehicle gateway 101.

Further, in the on-vehicle communication system according to an embodiment of the present disclosure, the control unit 32 in the in-vehicle gateway 101 is configured to determine abnormality in both the processing unit 52 and the switch unit 51 in the out-vehicle gateway 151, the control unit 32 is not restricted to this configuration. The control unit 32 may be configured not to determine abnormality in the switch unit 51, although it determines abnormality in the processing unit 52.

Further, in the on-vehicle communication system according to an embodiment of the present disclosure, the control unit 32 in the in-vehicle gateway 101 is configured to control communication of a device inside the vehicle through the switch unit 51 if the control unit 32 determines that abnormality occurs in the switch unit 51, the control unit 32 is not restricted to this configuration. The control unit 32 may be configured to control communication of a device inside the vehicle through the switch unit 51 if the control unit 32 determines that abnormality occurs in the processing unit 52. More specifically, the control unit 32 controls communication of a device inside the vehicle through the switch unit 51 if it is determined that the processing unit 52 is hung up.

Further, in the on-vehicle communication system according to an embodiment of the present disclosure, the control unit 32 in the in-vehicle gateway 101 is configured to control the relay processing of the switch unit 51 in the out-vehicle gateway 151 through the serial cable 12, the control unit 32 is not restricted to this configuration. The control unit 32 may be configured to control the relay processing of the switch unit 51 in the out-vehicle gateway 151 through the communication unit 31 and the Ethernet cable 10.

By the way, a gateway for relaying information from an external device outside a vehicle to an internal device inside the vehicle can be provided in the vehicle. With such a configuration, if the gateway receives an intentional attack of being sent a large amount of data from an external device, the operation of the gateway becomes unstable. Technology capable of realizing a more stable operation of the gateway by redundancy of the system has been demanded. However, such redundancy has not been disclosed in the Japanese Patent Application Laid-Open Publication No. 2016-12932.

To the contrary, the vehicle gateway according to the embodiment of the present disclosure is mounted on a vehicle. The communication unit 31 can communicate with an external device through other gateway capable of communicating with the external device outside the vehicle. The other gateway includes the switch unit 51 which executes the relay processing of relaying communication data and the processing unit 52 which controls the relay processing of the switch unit 51. The communication unit 31 can relay communication data received from the switch unit 51 to a device inside the vehicle. Then, the control unit 32 determines abnormality in the processing unit 52 and if it determines that abnormality occurs, the control unit 32 controls the relay processing of the switch unit 51.

With such a configuration, for example, if other gateway receives an intentional attack from an external device so that it cannot control its own relay processing properly, the in-vehicle gateway 101 can control the relay processing of the other gateway instead of the other gateway. Therefore, redundancy in operation of the gateway which relays information from an external device is achieved in the on-vehicle network, thereby realizing a more stable operation of the gateway. As a result, communication data can be relayed stably. Thus, a case where any important communication data for vehicle control for automatic driving, for example, is not relayed can be avoided.

Further, in the in-vehicle gateway according to an embodiment of the present disclosure, the control unit 32 controls communication through the switch unit 51 of an external device by controlling the relay processing of the switch unit 51.

With such a configuration, the relay processing of the switch unit 51 can be controlled in correspondence to an object therefor. More specifically, the relay processing for communication data with an external device can be stopped or inhibited although the relay processing for communication data between devices inside the vehicle is continued.

Further, in the vehicle gateway according to an embodiment of the present disclosure, the control unit 32 controls the relay processing of the switch unit 51 so as to shut down communication from an external device.

With such a configuration, unfavorable data such as large-amount data aiming at attack and illegal data can be prevented from flowing into the on-vehicle network. Thus, security of the on-vehicle network can be improved.

Further, in the vehicle gateway according to an embodiment of the present disclosure, the control unit 32 controls communication of a device inside the vehicle through the switch unit 51 by controlling the relay processing of the switch unit 51.

With such a configuration, the relay processing of the switch unit 51 can be controlled in correspondence to an object therefor. More specifically, for example, communication of a device inside the vehicle through the switch unit 51 can be stopped or inhibited.

Further, in the in-vehicle gateway according to an embodiment of the present disclosure, the control unit 32 determines abnormality in the switch unit 51 and then, executes a processing corresponding to a determination result.

With such a configuration, abnormality in the routing table indicating a communication route for communication data and abnormality such as a low success rate about the relay processing can be determined regardless of normality or abnormality in the processing unit 52. Further, if the control unit 32 determines that the switch unit 51 is abnormal, the control unit 32 recognizes that the relay processing between devices inside the vehicle is not being executed properly and executes a necessary processing. If the control unit 32 determines that the switch unit is normal, the control unit 32 can continue the relay processing between the devices inside the vehicle.

Further, in the in-vehicle gateway according to an embodiment of the present disclosure, if the control unit 32 determines that abnormality occurs in the switch unit 51, the control unit 32 shuts down communication of a device inside the vehicle through the in-vehicle gateway 101 thereof.

With such a configuration, for example, when a device inside the vehicle is connected to a network outside the vehicle not through other gateway, unfavorable data can be prevented from flowing from the outside network into the on-vehicle network by mistake. Thus, security in the on-vehicle network can be improved.

Further, in the in-vehicle gateway according to an embodiment of the present disclosure, the control unit 32 notifies of a content based on the abnormality determination result.

Such a configuration can notify user of a situation of the abnormal relay processing in other gateway.

Further, the on-vehicle communication system according to the embodiment of the present disclosure is mounted on a vehicle. The out-vehicle gateway 151 can communicate with an external device outside the vehicle. The in-vehicle gateway 101 can communicate with an external device through the out-vehicle gateway 151. In the out-vehicle gateway 151, the switch unit 51 executes relay processing of relaying communication data. The processing unit 52 controls the relay processing of the switch unit 51. The in-vehicle gateway 101 can relay communication data received from the switch unit 51 to a device inside the vehicle. Then, the in-vehicle gateway 101 determines abnormality in the processing unit 52 and if it determines that abnormality occurs, the in-vehicle gateway 101 controls the relay processing of the switch unit 51.

With such a configuration, for example, if the out-vehicle gateway 151 receives an intentional attack from an external device so that it cannot control its own relay processing properly, the in-vehicle gateway 101 can control the relay processing of the out-vehicle gateway 151 instead of the out-vehicle gateway 151. Thus, in the on-vehicle network, redundancy in operation of the gateway which relays information from an external device is achieved thereby realizing a more stable operation of the gateway. As a result, communication data can be relayed stably. Thus, a case where any important communication data for vehicle control for automatic driving, for example, is not relayed can be avoided.

It should be considered that the above-described embodiments are exemplifications but not restrictive. A scope of the present disclosure is indicated not by the above description but by a scope of claims and it is intended that all modifications having an equivalent meaning as the scope of claims and within the scope of claims are included in the present disclosure.

The above description contains features described below.
[Note 1]
A gateway that is mounted on a vehicle, including:
a communication unit that can communicate with an external device through other gateway capable of communicating with an external device outside said vehicle,
wherein said other gateway includes:
a switch unit that executes relay processing of relaying communication data; and
a processing unit that controls said relay processing of said switch unit,
wherein said communication unit can relay communication data received from said switch unit to a device inside said vehicle,
wherein said gateway further includes:
a control unit that determines abnormality in said processing unit and if it is determined that said abnormality occurs, controls said relay processing of said switch unit,
wherein said external device is a server and a maintenance terminal device,
wherein said gateway is a central gateway,
wherein a device inside said vehicle is a control device connected via CAN,
wherein as said determination, said control unit determines whether said processing unit is hung up.
[Note 2]
An on-vehicle communication system that is mounted on a vehicle, including:
a first gateway that can communicate with an external device outside said vehicle; and
a second gateway that can communicate with said external device through said first gateway,
wherein said first gateway includes:
a switch unit that executes relay processing of relaying communication data, and;
a processing unit that controls said relay processing of said switch unit,
wherein said second gateway can relay communication data received from said switch unit to a device inside said vehicle, and
said second gateway determines abnormality in said processing unit and if it is determined that said abnormality occurs, controls said relay processing of said switch unit,
wherein said external device is a server and a maintenance terminal device,
wherein said second gateway is a central gateway, wherein a device inside said vehicle is a control device connected via CAN (Controller Area Network), wherein as said determination, said second gateway determines whether said processing unit is hung up.

It is to be noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A gateway that is mounted on a vehicle, comprising:
a communication circuit communicating with an external device through other gateway capable of communicating with the external device outside said vehicle,
wherein said other gateway includes:
a switch circuit executing relay processing of relaying communication data;
a first non-transitory computer readable memory; and
a first hardware processor coupled to the first non-transitory computer readable memory and configured to read instructions from the first non-transitory computer readable memory to cause said other gateway to perform first operations to control said relay processing of said switch circuit,
wherein said communication circuit relays communication data received from said switch circuit to a device inside said vehicle,
wherein said gateway further includes:
a second non-transitory computer readable memory; and
a second hardware processor coupled to said second non-transitory computer readable memory and configured to read instructions from said second non-transitory computer readable memory to cause said gateway to perform second operations to determine abnormality in said other gateway and if it is determined that said abnormality occurs in said other gateway, to control relay processing of said switch circuit in said other gateway.

2. The gateway according to claim 1, wherein the second operations include, if it is determined that said abnormality occurs in said other gateway, shutting down communication of a device inside said vehicle through said gateway thereof by controlling relay processing of said switch circuit.

3. The gateway according to claim 1, wherein said second operations include controlling communication of said external device through said switch circuit by controlling said relay processing of said switch circuit.

4. The gateway according to claim 3, wherein said second operations include controlling said relay processing of said switch circuit so as to shut down communication from said external device.

5. The gateway according to claim 1, wherein said second operations include controlling communication of a device inside said vehicle through said switch circuit by controlling said relay processing of said switch circuit.

6. The gateway according to claim 1, wherein said second operations include notifying of a content based on abnormality determination result of said switch circuit in said other gateway as an abnormality of said other gateway.

7. An on-vehicle communication system that is mounted on a vehicle, comprising:
a first gateway communicating with an external device outside said vehicle; and
a second gateway communicating with said external device through said first gateway,
wherein said first gateway includes:
a switch circuit executing relay processing of relaying communication data;
a first non-transitory computer readable memory; and
a first hardware processor coupled to the first non-transitory computer readable memory and configured to read instructions from the first non-transitory computer readable memory to cause said first gateway to perform first operations to control said relay processing of said switch circuit,
wherein said second gateway relays communication data received from said switch circuit to a device inside said vehicle, and
said second gateway includes:
a second non-transitory computer readable memory; and
a second hardware processor coupled to said second non-transitory computer readable memory and configured to read instructions from said second non-transitory computer readable memory to cause said second gateway to perform second operations to determine abnormality in said first gateway and if it is determined that said abnormality occurs in said first gateway, to control relay processing of said switch circuit in said first gateway.

8. A communication control method for a gateway mounted on a vehicle, said communication control method comprising:
communicating with an external device through other gateway capable of communicating with said external device outside said vehicle,
wherein said other gateway includes:
a switch circuit that executes relay processing of relaying communication data,
a first non-transitory computer readable memory, and
a first hardware processor coupled to the first non-transitory computer readable memory and configured to read instructions from the first non-transitory computer readable memory to cause said other gateway to perform first operations to control said relay processing of said switch circuit,
wherein said communication control method further comprises:
relaying communication data received from said switch circuit to a device inside said vehicle;
determining any abnormality in said other gateway; and
if it is determined that said abnormality occurs in said other gateway, controlling relay processing of said switch circuit in said other gateway.

9. A communication control method for an on-vehicle communication system mounted on a vehicle, said communication control method comprising:
communicating, by a first gateway, with an external device outside said vehicle; and
communicating, by a second gateway, with said external device through said first gateway,
wherein said first gateway includes:
a switch circuit that executes relay processing of relaying communication data;
a first non-transitory computer readable memory; and a first hardware processor coupled to the first non-transitory computer readable memory and configured to read instructions from the first non-transitory computer readable memory to cause said first gateway to perform first operations to control said relay processing of said switch circuit, wherein said communication control method further comprises:

relaying, by said second gateway, communication data received from said switch circuit to a device inside said vehicle;

determining, by said second gateway, abnormality in said first gateway; and if it is determined that said abnormality occurs in said first gateway, controlling, by said second gateway, relay processing of said switch circuit in said first gateway.

10. A computer readable non-transitory recording medium recording a communication control program for use in a gateway mounted on a vehicle, said program making a computer function as a communication circuit communicating with an external device through other gateway capable of communicating with the external device outside said vehicle, wherein said other gateway includes:

a switch circuit that executes relay processing of relaying communication data;

a first non-transitory computer readable memory; and a first hardware processor coupled to the first non-transitory computer readable memory and configured to read instructions from the first non-transitory computer readable memory to cause said other gateway to perform first operations to control said relay processing of said switch circuit, wherein said communication circuit relays communication data received from said switch circuit to a device inside said vehicle, said communication control program further making the computer function to perform second operations to determine abnormality in said other gateway and if it is determined that said abnormality occurs in said other gateway, to control relay processing of said switch circuit in said other gateway.

\* \* \* \* \*